(12) United States Patent
Maheshwari et al.

(10) Patent No.: US 9,747,179 B2
(45) Date of Patent: Aug. 29, 2017

(54) DATA MANAGEMENT AGENT FOR SELECTIVE STORAGE RE-CACHING

(71) Applicant: NetApp, Inc., Sunnyvale, CA (US)

(72) Inventors: Nilesh Maheshwari, Sunnyvale, CA (US); Sreenivasa Potakamuri, Sunnyvale, CA (US); Lucky Tiffany, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 70 days.

(21) Appl. No.: 14/927,395

(22) Filed: Oct. 29, 2015

(65) Prior Publication Data

US 2017/0123939 A1 May 4, 2017

(51) Int. Cl.
*G06F 11/00* (2006.01)
*G06F 11/16* (2006.01)
*H04L 29/08* (2006.01)

(52) U.S. Cl.
CPC ...... *G06F 11/1662* (2013.01); *G06F 11/1666* (2013.01); *H04L 67/1095* (2013.01); *H04L 67/1097* (2013.01); *H04L 67/2842* (2013.01); *G06F 2201/805* (2013.01)

(58) Field of Classification Search
USPC ........................................................ 714/4.11
See application file for complete search history.

(56) References Cited

U.S. PATENT DOCUMENTS

| | | | | |
|---|---|---|---|---|
| 2009/0249115 | A1* | 10/2009 | Bycroft | H04L 12/462 714/47.1 |
| 2013/0055018 | A1* | 2/2013 | Joshi | G06F 11/2058 714/19 |
| 2013/0305086 | A1* | 11/2013 | Yulizar | G11B 20/10527 714/6.3 |
| 2016/0179635 | A1* | 6/2016 | Kondalsamy | G06F 11/203 714/4.12 |

\* cited by examiner

*Primary Examiner* — Sarai Butler
(74) *Attorney, Agent, or Firm* — Klein, O'Neill & Singh, LLP (57) ABSTRACT

A data management agent for selective storage re-caching is described. A data management agent with an inter-agent communication link and protocol updates a volume on a primary storage area network connected to the data management agent. The primary storage area network mirrors the update to the volume over a first connection to a corresponding volume on a recovery storage area network. The data management agent further transmits a notification of the update to the volume over a second connection to a recovery data management agent connected to the recovery storage area network. Upon receiving the notification, the recovery data management agent scans only the corresponding volume and selectively refreshes its cached information for the corresponding volume.

20 Claims, 5 Drawing Sheets

DATA MANAGEMENT AGENT FOR SELECTIVE STORAGE RE-CACHING

TECHNICAL FIELD

Examples described herein relate to storage devices, and more specifically, to a data management agent for selective storage re-caching.

BACKGROUND

In computing, a file server is a device attached to a network that has the primary purpose of providing a location for shared disk access, i.e., shared storage of computer files (such as documents, sound files, photographs, movies, images, databases, etc.) that can be accessed by other machines or virtual machines connected to the network. The term "server" highlights the role of the device in the client-server scheme, where the clients are the machines using the storage. A file server is typically not intended to run programs on behalf of its clients. Instead, it is designed primarily to enable the storage and retrieval of data while the computation is carried out on the clients themselves.

One common type of file server is a network-attached storage (NAS) device. NAS is specialized for serving files either by its hardware, software, or configuration, and is often manufactured as a computer appliance—a purpose-built specialized computer. NAS systems are networked appliances which contain one or more storage drives, often arranged into logical, redundant storage containers or RAID.

File servers, including NAS devices, can also be utilized to form a storage area network (SAN), which provides access to consolidated, block level data storage. SANs are primarily used to enhance storage devices, such as disk arrays and tape libraries, so that the devices appear to the operating system as locally attached devices. A SAN typically has its own network of storage devices that are generally not individually exposed outside of the SAN. The cost and complexity of SANs have dropped over time, allowing wider adoption across both enterprise and small to medium-sized business environments. At the same time, the number of file storage products and servers, including NAS devices, has greatly increased.

In order to ensure that important data and services remain online even in the event of an unexpected outage or disaster, file servers and SANs can utilize various techniques broadly categorized as high-availability. For example, high-availability clusters (also known as HA clusters or fail over clusters) are groups of computers that support server applications that can be reliably utilized with a minimum of downtime. They operate by using high availability software to harness redundant computers in groups or clusters that provide continued service when system components fail. Without clustering, if a server running a particular application crashes, the application will be unavailable until the crashed server is fixed. HA clustering remedies this situation by detecting hardware/software faults and immediately restarting the application on another system, usually without requiring administrative intervention, a process known as failover. As part of this process, clustering software may configure the node before starting the application on it. For example, appropriate file systems may need to be imported and mounted, network hardware may have to be configured, and some supporting applications may need to be running as well. HA clusters are often used for critical databases, file sharing on a network, business applications, and customer services such as electronic commerce websites. HA cluster implementations attempt to build redundancy into a cluster to eliminate single points of failure, including multiple network connections and data storage which is redundantly connected via storage area networks.

DETAILED DESCRIPTION

Examples as described implement an inter-agent communication link and protocol to avoid performance penalties on storage area networks (SAN) and to add high-availability (HA) solutions for agents, or providers, that manage communications with the SANs. According to some examples, these agents implement the storage management initiative specification, commonly abbreviated SMI-S. The inter-agent communication link and protocol as described can leverage a partial discovery model between primary and recovery sites to improve SAN and overall system performance while also creating support for pairs of agents that can exchange heartbeat messages to achieve high-availability.

In providing a mechanism for communication between data management agents, examples as described herein recognize open-standard protocols and classes, such as the ones defined by the Storage Management Initiative Specification (SMI-S), that allow storage system administrators to manage and monitor SANs comprising heterogeneous storage devices. An agent implementing SMI-S, for example, can replace the need for multiple managed-object models, protocols, and transports with a single object-oriented model capable of fully discovering all devices in a storage network. However, this single agent management model comes with its own set of shortcomings, which are especially notable in preparing for disaster recovery. For example, when a recovery data storage system and SAN are established for disaster recovery, a conventional agent at the source site needs to fully manage the SAN on recovery site, and the agent at the recovery site needs to fully manage the SAN on the source site. This fully discovered model adds substantial performance penalties when the source and recovery sites are at different geographic locations and multiple storage devices are managed by the agents. In addition, a single agent at each site creates a single point of failure and is not compatible with high-availability solutions that storage customers have come to expect. By addressing these shortcomings, examples make SANs comprising heterogeneous storage devices in HA environments more attractive for enterprise and commercial environments.

In the enterprise information technology (IT) market, some of the largest risks deal with the lack of a disaster recovery (DR) or business continuity (BC) solution. Despite deploying HA servers connected to HA storage, a site can still be vulnerable. One complicating factor is that the person who deploys a cloud of virtual machines (VMs) is responsible for protecting those machines, yet the storage itself is usually managed by an entirely different team, and backup operations are managed by yet another team. This can result in many machines going unprotected and unnoticed. Any business or organization can experience an incident that prevents it from continuing normal operations, such as a flood or fire, or a serious computer malfunction or information security incident. Physical hardware such as servers and network switches can fail without warning, bringing down critical IT infrastructure and severely affecting businesses. It's not only the vulnerability of system components that are exposed; bigger events could bring entire sites down.

Therefore, proper disaster recovery requires an investment in a secondary storage site. When the primary production site is temporarily or permanently unusable, an effective disaster recovery plan allows the continued operation of machines hosted at the secondary site. To make this transition easier, virtual machines running in cloud computing environments can be deployed on both sites.

Private and public cloud technologies have not only drastically changed the manner in which IT departments offer services, but of IT infrastructure itself. Business applications for different services are taking advantage of virtualization technologies, and servers running such applications are often virtualized. In most cases virtual machines (VMs) do not have hard dependencies on hardware on which they are running and can easily be moved from one physical server to another, even if the other server is located at a remote site.

Examples herein recognize the need to connect multiple private and public clouds into a single IT infrastructure and the need to enable virtual machines to move not only between virtual machine clusters within a single site, but also between multiple sites in secondary public and private cloud data centers. Site recovery technologies that enable this single IT infrastructure take disaster recovery to a new level, enabling disaster recovery in a simplified, orchestrated, and more automated manner. Rather than the lengthier backup and restore process, business applications and IT services can be restored within minutes, minimizing recovery point objectives (RPO) and recovery time objectives (RTO).

At the same time, storage companies have been developing technologies to replicate data to remote sites for disaster recovery purposes. A conventional site recovery system can orchestrate DR workflows by invoking virtual machine manager and storage management agent calls to do storage failover, fail-back and test-failover. To manage storage failover and fail-back for DR, each site can use a virtual machine manager that communicates with a storage management agent. However, examples recognize that conventional storage management agents do not communicate, and therefore each of these agents fully manages the storage (e.g., a SAN) on both sites. This adds performance penalties when the source and recovery sites are at different geographic locations because management traffic between an agent at one site and the SAN at the other site competes with data replication traffic between the SANs themselves, both in terms of bandwidth and computing resources.

An inter-agent communication link and protocol as described provide numerous benefits over conventional approaches, including leveraging a partial discovery model to avoid the performance hit of full discovery models and achieving true high-availability between storage management agents.

In some aspects, a data management agent with an inter-agent communication link and protocol updates a volume on a primary storage area network connected to the data management agent. The primary storage area network mirrors the update to the volume over a first connection to a corresponding volume on a recovery storage area network. The data management agent further transmits a notification of the update to the volume over a second connection to a recovery data management agent connected to the recovery storage area network. Upon receiving the notification, the recovery data management agent scans only the corresponding volume and selectively refreshes its cached information for the corresponding volume.

Among other benefits, this protocol ensures that the caches for both the primary and recovery agents are in sync for all the storage devices they are managing. In addition, transmitting notifications of updates over a second connection eliminates management traffic over the first connection, improving performance for data transfers between the primary and recovery storage area networks. Still further, inter-agent notifications to perform selective re-caching allow agents to update cached data for specific volumes on the storage area networks rather than updating the cache for the entire SAN, which can be inefficient and impact performance of the SAN, agent, and data management system as a whole. Rather than polling the SAN on a periodic basis to discover updates to volumes, inter-agent notifications allow a data management agent to quickly and efficiently update its cache to reflect the updates to the volumes.

In some aspects, a data management agent operates in a partial discovery mode and exchanges only basic information about storage devices, virtual servers, etc. that the data management agent does not manage completely. For example, in a configuration with primary and recovery storage devices in different geographic locations, a primary data management agent manages the primary storage devices and a recovery data management agent should manage only the recovery storage devices. However, to orchestrate a disaster recovery failover, the primary data management agent should have basic information about the recovery storage devices, and vice-versa. The data management agent can retrieve sufficient configuration information from devices on the primary storage area network to enable a predetermined failover process. This configuration information can be transmitted over the second connection to the recovery data management agent, which can use the configuration information as part of the storage failover process from the primary data management agent to the recovery data management agent.

With an inter-agent communication protocol as described herein, a primary data management agent can fetch only relevant data about recovery storage devices through the recovery data management agent, and vice-versa. One technical benefit of this arrangement is a reduction in management traffic between data management agents and SANs, which can improve the performance of other tasks performed at the data management agents and SANs.

In further aspects, a pair of data management agents can form a high-availability cluster to provide a redundant communication link from machines to a SAN in the event that one of the data management agents fails. In this arrangement, one data management agent is set to passive while the other actively manages communications. In one example, the passive data management agent can exchange heartbeat messages with the active data management agent that manages communications with the primary storage area network. If the passive data management agent fails to receive an expected heartbeat message from the active data management agent, the passive data management agent can take control of communications with the primary storage area network. In another example, a recovery data management agent can exchange heartbeat messages with a primary data management agent at a remote site and initiate a storage failover process if the recovery data management agent fails to receive an expected heartbeat message from the data management agent.

In some examples, the primary and recovery SANs can include multiple heterogeneous storage devices or server appliances, which can be simultaneously managed by the data management agent using block-based protocols such as Fibre Channel (FC), Fibre Channel over Ethernet (FCoE), iSCSI, ATA over Ethernet (AoE), and HyperSCSI.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Overview

Figure 1:
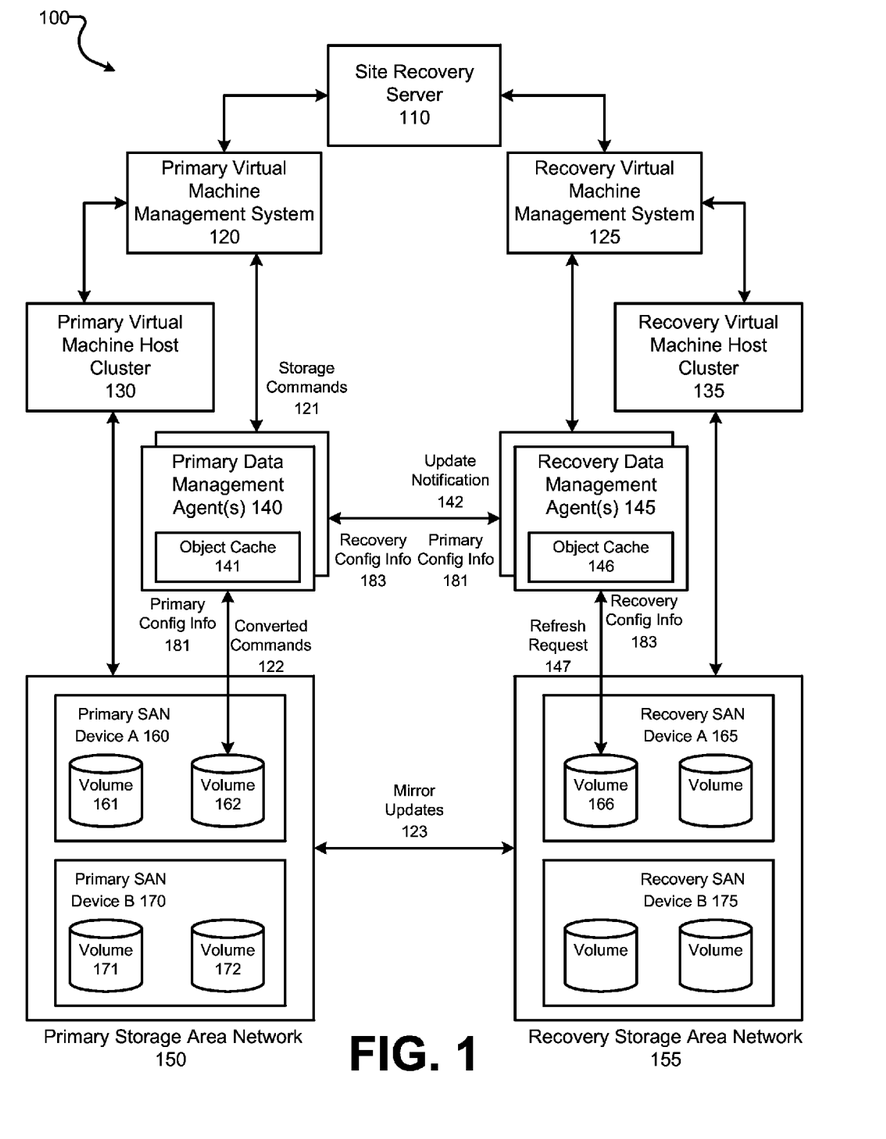
FIG. 1 illustrates an example data storage system within which a data management agent for selective storage re-caching can be provided, in accordance with some aspects.

FIG. 1 illustrates an example data storage system 100 within which a data management agent for selective storage re-caching can be provided, in accordance with some aspects. In an example shown, the data storage system 100 includes a site recovery server 110 to coordinate the failover of servers and server clusters located on the primary site to counterparts located on the recovery site. The primary site includes a primary virtual machine management system 120, primary virtual machine host cluster 130, primary data management agent 140, and a primary SAN 150. The primary data management agent 140 communicates with a recovery data management agent 145 on the recovery site to ensure that the object caches 141, 146 for both agents are in sync for the storage devices they are managing on the primary SAN 150 and recovery SAN 155. In addition, both agents can operate in a partial discovery mode and exchange only the basic information about the storage devices and virtual machines at each site that the agents can use for failover procedures.

In the example shown, the recovery site comprises similar servers and server clusters that can be used as part of disaster recovery and high-availability solutions, including a recovery virtual machine management system 125, recovery virtual machine host cluster 135, recovery data management agent 145, and a recovery SAN 155.

In some aspects, site recovery server 110 runs a service to protect customer environments by moving server virtual machines, such as the virtual machines running on primary virtual machine host cluster 130, between on-premises and recovery sites, which can be a cloud-based infrastructure. The site recovery server 110 can help protect important applications by coordinating VM failover and utilizing storage replication between clouds. In one example, site recovery server 110 acts as the main orchestration mechanism to coordinate the failover of the VM compute, operating system, and configuration from one location to another. Site recovery server 110 can coordinate with the primary virtual machine management system 120 to offload the actual data replication to the target devices, such as primary SAN device A 160 and primary SAN device B 170.

Using SAN replication with the site recovery server 110 enables data management system 100 to leverage the existing SAN infrastructure for storage replication, which can provide support for guest clusters and checks for replication consistency across different tiers of an application with synchronized replication. SAN replication also allows for replication of guest-clustered virtual machines to iSCSI or Fibre Channel storage or by using shared virtual hard disks (VHDXs).

In some aspects, site recovery server 110 performs failover operations using replicas generated by servers in the primary virtual machine host cluster 130 to replicate virtual machines between different locations. In addition, replication can be performed asynchronously between two hosting sites through simple configuration without requiring either shared storage or any specific storage hardware. Any server workload that can be virtualized can be replicated. Replication of standalone servers, failover clusters, or a mixture of both works over any ordinary IP-based network, and the replicated data can be encrypted during transmission. The servers can be physically collocated or widely separated geographically. In some examples, the physical servers do not need to be in the same domain or even joined to any domain at all.

Primary virtual machine management system (VMM) 120 is a management solution for a virtualized datacenter that enables the configuration and management of virtualized hosts, networking, and storage resources in order to create and deploy virtual machines and services to servers and clouds. In the example of FIG. 1, virtual machines and services can be deployed on the primary virtual machine host cluster 130, and the primary SAN 150 can provide the necessary storage resources. VMM 120 can provide a consolidated view of virtual machines across servers in the primary virtual machine host cluster 130, including virtual machines running in different environments.

In some aspects, resources in VMM 120 make up a fabric that contains configuration information for deployed virtual machines and services in the primary virtual machine host cluster 130. These resources can include:

Virtual machine hosts, which are machines from various server providers on which virtual machines and services can be deployed. These virtual machine hosts together make up the primary virtual machine host cluster 130. Host groups can be created to organize hosts based on physical site location, resource allocation, or other criteria.

Networking resources, such as logical networks, IP address pools, and load balancers that are used to deploy virtual machines and services.

Storage resources, such as storage classifications, logical units, and storage pools that are made available to the primary virtual machine host cluster 130. These storage resources can include volumes such as volumes 161, 162 on primary SAN device A 160 and volumes 171, 172 on primary SAN device B 170.

Library servers and library shares, which represent a catalog of resources (for example, virtual hard disks, templates, and profiles) that are used to deploy virtual machines and services.

Virtualized workloads in VMM 120 utilize storage resources, including both local and remote storage, to meet capacity and performance requirements. Local storage represents the storage capacity that is available on a server or that is directly attached to a server. For example, disk drives on the servers in the primary virtual machine host cluster 130 are local storage. Remote storage offloads work from the server to an external storage device where the storage hardware provides scaling and capacity. In the example of FIG. 1, primary SAN 150 provides remote storage for the primary virtual machine host cluster 130.

In some aspects, VMM 120 can support multiple storage solutions including block storage, file storage, and storage provisioning. VMM 120 supports the use of block-level storage devices that expose logical unit numbers (LUNs) for storage by using Fibre Channel, iSCSI, Serial Attached SCSI (SAS), and other connection mechanisms to the primary SAN 150. In some examples, VMM 120 accesses the storage devices on primary SAN 150 through primary data management agent 140, which can convert generic storage commands 121 to converted commands 122 that are recognized by different types of storage devices like primary SAN device A 160 and primary SAN device B 170.

VMM 120 can also support the use of network shares for storage. Network shares that support the Server Message Block (SMB) 3.0 Protocol can reside on a file server or on a network-attached storage (NAS) device, which can be, for example, primary SAN device A 160. In addition, VMM 120 can provision new logical units from available capacity for a host or host cluster. New logical units can be provisioned by using any of the following methods:

From available capacity—Create a new logical unit (LUN) from available capacity when there is a pool of storage available. A number of logical units and the size of each logical unit can be specified. For example, the LUN can be created on volume 162 of primary SAN device A 160.

From a writeable snapshot of an existing logical unit—Create a writeable snapshot of an existing logical unit enables the rapid creation of many copies of an existing virtual disk. This allows the provisioning of multiple virtual machines in a short amount of time with minimal load on the hosts. Depending on the array, snapshots use space very efficiently and can be created almost instantaneously.

From a clone of a logical unit—Create a clone of an existing logical unit offloads the work of creating a full copy of a virtual disk to the array. Depending on the array, clones typically do not use space efficiently and can take some time to create.

Storage allocation—Allocate available storage pools and LUNs to defined host groups that can represent, for example, business groups and locations. Resources are typically allocated on the host group level before they can be assigned to hosts.

In some aspects, VMM 120 is comprised of multiple components, including a VMM management server, database, and console. The management server is the component that does all of the heavy lifting. It is the core Virtual Machine Management Server component that is responsible for processing commands and for running the underlying VMM service. The management server is also responsible for coordinating communications between all of the various components. The VMM database is an SQL Server database that stores all of the configuration information that is used by VMM 120. This database also stores things like profiles and service templates. The VMM console is the graphical user interface for VMM 120.

VMM 120 can improve scalability by providing an organization level view of virtual machine resources, rather than limiting the administrator to working with virtual machine hosts on a server by server basis. As part of these managing these resources, VMM 120 at the primary site manages the primary SAN 150, and recovery VMM 125 manages the recovery SAN 155. In some examples, primary data management agent 140 and recovery data management agent 145 assist in managing the SANs by converting commands to the SANs, sending updates to their peer agent, and exchanging basic configuration information with their peer agent.

Primary virtual machine host cluster 130 can comprise any number of servers arranged in clusters and cloud configurations that run virtual machines managed by the primary VMM 120. These server hosts include processing, memory, networking, and other resources that deployed virtual machines make use of, although most of the storage for the virtual machines can be provided on the primary SAN 150. In some examples, hosts can run a hypervisor, or virtual machine manager, that provides management interfaces for the virtual machines running on that host. In addition, VMM 120 can manage the virtual machines on that host and on other hosts that make up the primary virtual machine host cluster 130.

Primary data management agent 140 parses generic requests (i.e., storage commands 121) from the VMM 120 and converts the requests into converted commands 122 that may be executed on primary SAN 150 devices. In some aspects, primary data management agent 140 implements the Storage Management Initiative Specification (SMI-S) as a method and common language for communication with primary VMM 120. Primary data management agent 140 can implement an HTTP server and a number of providers, each of which is configured to control specific devices, such as primary SAN device A 160 and primary SAN device B 170, which each have their own unique management interfaces. In one example, the providers parse generic application requests using the Common Information Model (CIM).

The providers act as Common Information Model Object Managers (CIMOM) while the VMM 120 acts as a CIM-Client. CIMOM collects, validates, and authenticates each application request and then responds to the application. It becomes a conduit for each request by invoking the appropriate command to handle the request. After converting the application requests to an appropriate command for the device using the vendor's application programming interface (API) for that device, the provider connects to the device and translates any responses, acknowledges, or commands back into CIM. This enables CIMClients to make generic requests across a heterogeneous environment, such as primary SAN 150. In addition, primary data management agent 140 can store user credentials for devices on the primary SAN 150.

In order to discover and interact with devices on the primary SAN 150, primary data management agent 140 maintains an object cache 141 that contains information about the devices. Devices can be described with profiles, sub profiles, classes, and associations, among other descriptors. A class is a set of properties and methods that pertain to a specific object, or to an aspect of an object. Classes typically inherit properties from base or super classes. An example class is a Disk Drive (in the CIM model, CIM_DiskDrive). Some properties of the disk drive might be what kind of drive it is (solid state drive, hard disk drive, etc.), how fast it spins, and its current status. A storage device vendor can introduce new properties and methods by creating their own version of a class, inheriting from the base class, and then adding their uniqueness to the derived class. In that way, the model allows extensibility while still preserving the common functionality that any application can use without understanding the specific value-added capabilities of the device it is trying to manage. The provider creates an instance of a class when it represents the actual objects, such as primary SAN device A 160 or primary SAN device B 170. In addition, if volume 162 represents a physical drive in primary SAN device A 160, it can be an instance of the Disk Drive class, and the instance can be stored in object cache 141. Object cache 141 can also store associations between related objects, and objects can take on different file formats depending on operating system, such as DLL or SO formats. Primary data management agent 140 can also include an interface that enables users to manage and monitor storage devices, including LUNs, volumes, CIMOM configuration settings, and CIM server users.

In some examples, VMM 120 relies on primary data management agent 140 as the main integration component to plug storage into hosts on the primary virtual machine host cluster 130. Storage can be provisioned by VMM 120 in a unified manner without the involvement of the storage administrator. VMM 120 can also control and utilize storage mirroring functionality exposed by primary data management agent 140.

Primary SAN 150 can use SAN replication techniques to transfer data from volumes on its constituent devices to corresponding volumes on devices of recovery SAN 155, such as recovery SAN Device A 165 and recovery SAN Device B 175. Examples recognize that "volume" can be used as a generic term referring to a defined area of storage, and therefore the usage of "volume" in examples can also refer to LUNs, partitions, file systems, file system objects, and the like.

In one aspect, SAN replication starts with the creation of a one time, baseline transfer of the data set before incremental updates can be performed. This operation includes creating a snapshot copy (baseline copy) of the source and transferring all of the data blocks referenced by it to the destination file system. After the initialization is complete, scheduled or triggered updates can occur. Each update transfers only the new and changed blocks from the source to the destination file system. This operation includes creating a snapshot copy at the source volume, comparing it with the baseline copy, and transferring only the changed blocks to the destination volume, illustrated as mirror updates 123 in FIG. 1. The new copy becomes the baseline copy for the next update. Further storage commands 121 from the VMM 120 and data from servers on the primary virtual machine host cluster 130 can trigger or be included in these updates.

In the example of FIG. 1, primary VMM 120 can issue a storage command 121 to create a cluster shared volume (e.g., volume 162) on a LUN and associate volume 162 with the primary virtual machine host cluster 130. Primary data management agent 140 receives storage command 121 and converts it to a converted command 122 that can be performed on primary SAN device A 160, which can send a mirror update 123 to recovery SAN 155 about the creation of this cluster shared volume. Recovery SAN device A 165 can then create a mirror of the cluster shared volume, for example as volume 166. Primary data management agent 140 stores information about volume 162 in its object cache 141 and also sends an update notification 142 to recovery data management agent 145 informing it of an update to the LUN in question. Recovery data management agent 145 can then send a refresh request 147 to recovery SAN device A 165 to discover the update to the LUN and add volume 166 to its object cache 146.

In some aspects, primary data management agent 140 operates in a partial discovery mode and exchanges only basic information about storage devices, virtual servers, etc. that the recovery data management agent 145 does not manage completely. In the example of FIG. 1, primary data management agent 140 manages the primary SAN 150 and recovery data management agent 145 should manage only the recovery SAN 155. However, to orchestrate a disaster recovery failover, the recovery data management agent 145 should have basic information about the primary SAN 150, and vice-versa. The primary data management agent 140 can retrieve primary configuration information 181 from devices on the primary SAN 150. Primary configuration information 181 can include only the information needed to enable a predetermined failover process. This configuration information can be transmitted directly to recovery data management agent 145 over a management connection and stored in object cache 146 with recovery data management agent 145. Recovery data management agent 145 can use the primary configuration information 181 as part of the storage failover process. In some aspects, the site recovery server 110 coordinates the overall failover process for data management system 100. Since data management system 100 can also failback to the primary site, recovery configuration information 183 from the recovery SAN 155 can also be transmitted and stored in object cache 141.

In some aspects, the data flow using NFS, CIFS, iSCSI, Fibre Channel (FC), or Fibre Channel over Ethernet (FCoE) is not impacted by communications to and from the data management agents. Only management traffic, not data, is sent through the SMI-S communication path, thereby leaving more bandwidth available for mirror updates 123 and other important traffic. In further aspects, the management and data connections utilize a direct network connection between primary and recovery sites rather than transferring data over the public Internet. Update notifications 142 and configuration information exchanged between peer data management agents may use XML over secure HTTP.

In addition to updating devices based on notifications, data management agents 140, 145 can update their object caches 141, 146 periodically to detect any out-of-band changes to the SANs. In one example, this periodic refresh occurs every five minutes.

Figure 2:
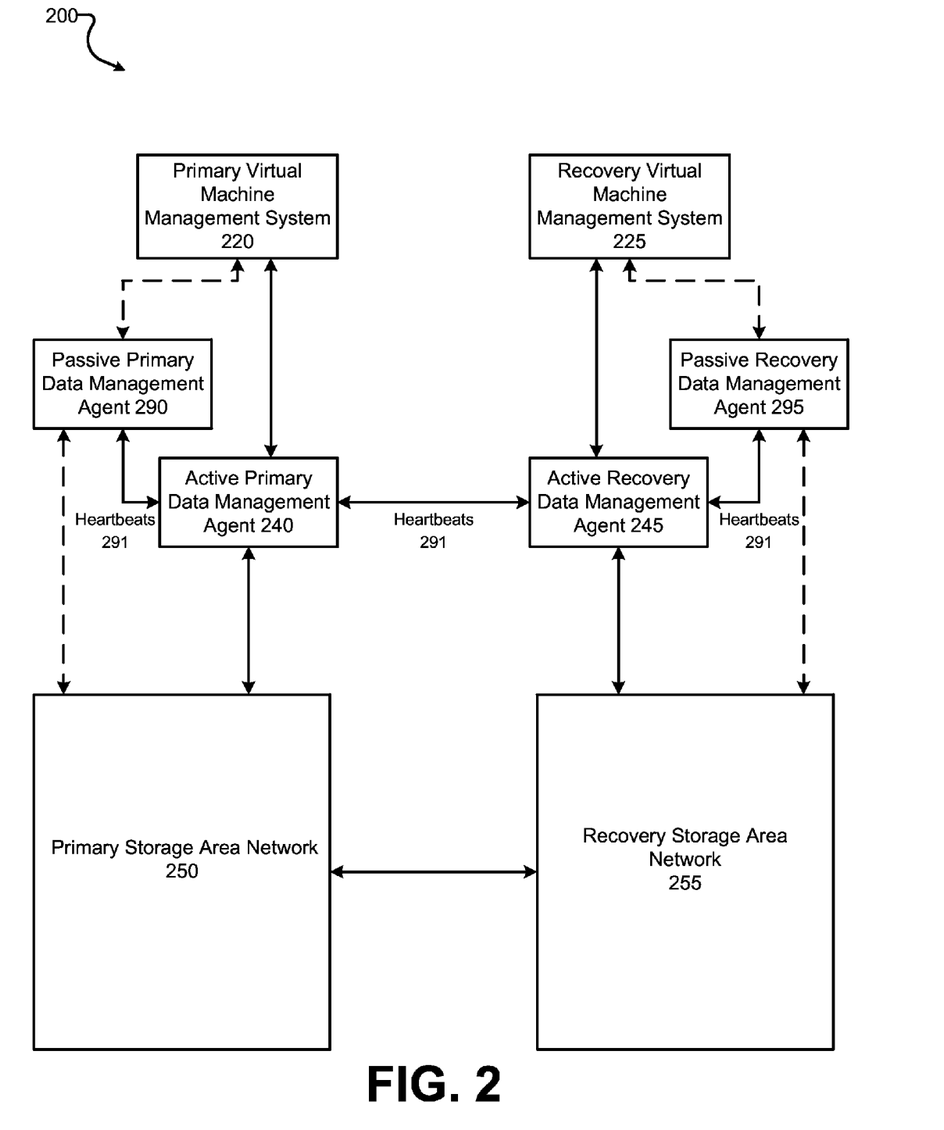
FIG. 2 illustrates an example data storage system within which multiple agents can be utilized to provide high-availability solutions, in accordance with some aspects.

FIG. 2 illustrates an example data storage system 200 within which multiple agents can be utilized to provide high-availability solutions, in accordance with some aspects. In the example shown, the components of data storage system 200 can correspond to their counterparts from FIG. 1. The remaining components of FIG. 1 can be present, but for simplicity are not illustrated in FIG. 2.

In some aspects, a pair of data management agents can form a high-availability cluster to provide a redundant communication link from servers, such as primary virtual machine management system 220, to the primary SAN 250 in the event that one of the data management agents 240, 290 fails. In this arrangement, one primary data management agent 290 is set to passive while the active primary data management agent 240 manages communications. In one example, the passive data management agent 290 can exchange heartbeat messages 291 with the active data management agent 240 that manages communications with the primary SAN 250. If the passive data management agent 290 fails to receive an expected heartbeat message 291 from the active data management agent 240, the passive data management agent 290 can take control of communications with the primary SAN 240. Similarly, the recovery site can include an HA pair of active recovery data management agent 245 and passive recovery data management agent 295 managing communications between a recovery virtual machine management system 225 and recovery SAN 255. These heartbeat messages 291 can be sent periodically and each data management agent configured to only initiate a takeover or failover process when a certain number of heartbeat messages 291 are missed.

In a further aspect, one or both of the recovery data management agents 245, 295 at the recovery site can exchange heartbeat messages 291 with primary data management agents 240, 290 at the primary site and initiate a disaster recovery storage failover process if they fail to receive an expected heartbeat message 291.

Methodology

Figure 3:
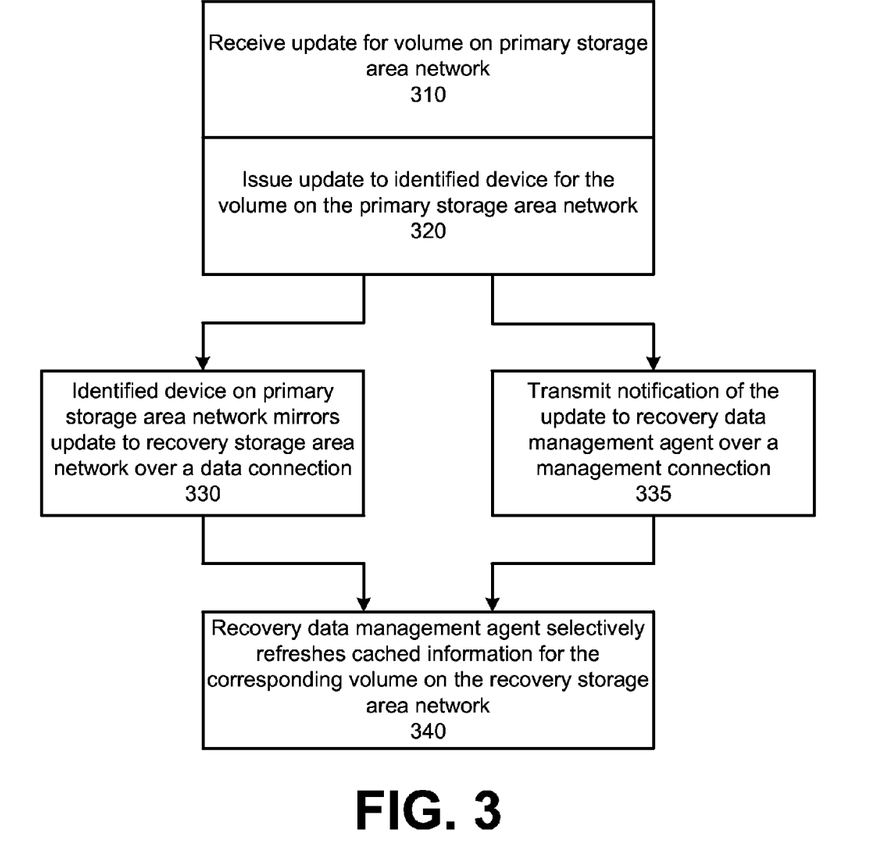
FIG. 3 illustrates an example method for selective storage re-caching, in accordance with some aspects.
Figure 4:
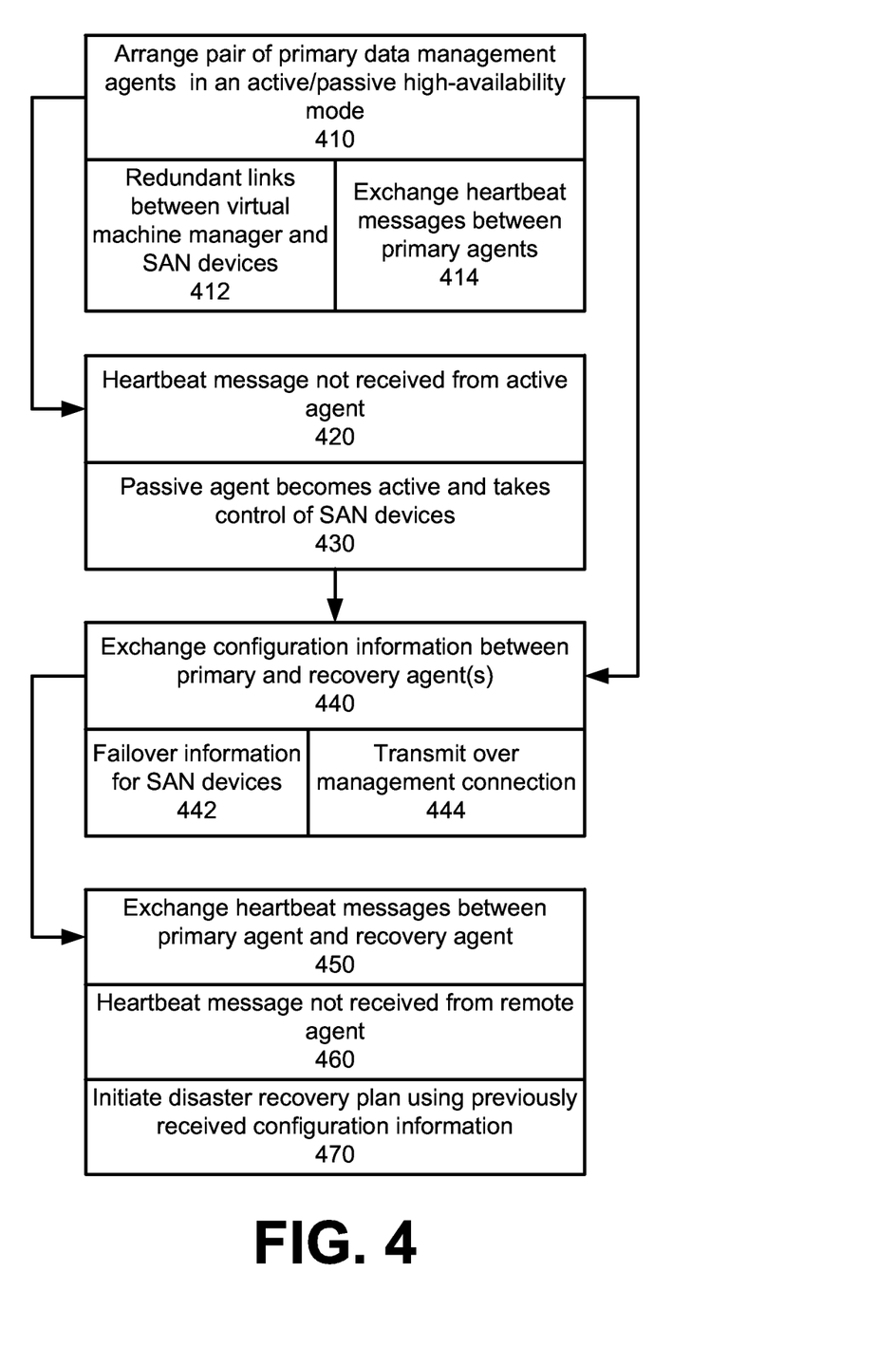
FIG. 4 illustrates an example method for efficient high-availability management between primary and recovery data management agents, in accordance with some aspects.

FIG. 3 illustrates an example method for selective storage re-caching, in accordance with some aspects. FIG. 4 illustrates an example method for efficient high-availability management between primary and recovery data management agents. While operations of examples of FIGS. 3 and 4 are described below as being performed by specific components, modules or systems of data storage system 100 or data storage system 200, it will be appreciated that these operations need not necessarily be performed by the specific components identified, and could be performed by a variety of components and modules, potentially distributed over a number of machines. Accordingly, references may be made to elements of system 100 for the purpose of illustrating suitable components or elements for performing a step or sub step being described. Alternatively, at least certain ones of the variety of components and modules described in system 100 can be arranged within a single hardware, software, or firmware component. It will also be appreciated that some of the steps of this method may be performed in parallel or in a different order than illustrated.

With reference to an example of FIG. 3, a primary data management agent 140 can receive an update for a volume on a primary SAN 150 in a data storage system 100 as described with FIG. 1 (310). For example, primary VMM 120 can issue a storage command 121 to create a cluster shared volume (e.g., volume 162) on a LUN and associate volume 162 with the primary virtual machine host cluster 130. Primary data management agent 140 receives storage command 121 and converts it to a converted command 122 that can be performed on primary SAN device A 160 (320).

In one aspect, the update triggers primary SAN device A 160 to send a mirror update 123, over a data connection, to recovery SAN 155 about the creation of this cluster shared volume (330). In another aspect, primary SAN device A 160 waits and periodically sends batches of updates. Recovery SAN device A 165 can then create a mirror of the cluster shared volume, for example as volume 166.

Primary data management agent 140 stores information about volume 162 in its object cache 141 and also sends an update notification 142 to recovery data management agent 145 informing it of an update to the LUN in question (335). Recovery data management agent 145 can then send a refresh request 147 to recovery SAN device A 165 to discover the update to the LUN and add volume 166 to its object cache 146 (340).

With reference to an example of FIG. 4, an active primary data management agent 240 can be placed in an HA pair with a passive primary data management agent 290 as described with FIG. 2 (410). The HA pair can provide a redundant communication link from servers, such as primary virtual machine management system 220, to the primary SAN 250 in the event that one of the data management agents 240, 290 fails (412). In this arrangement, one primary data management agent 290 is set to passive while the active primary data management agent 240 manages communications. In one example, the passive data management agent 290 can exchange heartbeat messages 291 with the active data management agent 240 that manages communications with the primary SAN 250 (414).

If the passive data management agent 290 fails to receive an expected heartbeat message 291 from the active data management agent 240 (420), the passive data management agent 290 can take control of communications with the primary SAN 240 (430). Similarly, the recovery site can include an HA pair of active recovery data management agent 245 and passive recovery data management agent 295 managing communications between a recovery virtual machine management system 225 and recovery SAN 255.

In some aspects, primary data management agent 140 operates in a partial discovery mode and exchanges only basic information about storage devices, virtual servers, etc. that the recovery data management agent 145 does not manage completely (440). In the example of FIG. 1, primary data management agent 140 manages the primary SAN 150 and recovery data management agent 145 should manage only the recovery SAN 155. However, to orchestrate a disaster recovery failover, the recovery data management agent 145 should have basic information about the primary SAN 150, and vice-versa. The primary data management agent 140 can retrieve primary configuration information 181 from devices on the primary SAN 150. Primary configuration information 181 can include only the information needed to enable a predetermined failover process (442). This configuration information can be transmitted directly to recovery data management agent 145 over a management connection and stored in object cache 146 with recovery data management agent 145 (444). Recovery data management agent 145 can use the primary configuration information 181 as part of the storage failover process. In some aspects, the site recovery server 110 coordinates the overall failover process for data management system 100. Since data management system 100 can also failback to the primary site, recovery configuration information 183 from the recovery SAN 155 can also be transmitted and stored in object cache 141.

In a further aspect, one or both of the recovery data management agents 245, 295 at the recovery site can exchange heartbeat messages 291 with primary data management agents 240, 290 at the primary site (450). Similar to the heartbeat messages 291 exchanged between peer data management agents, the recovery data management agents 245, 295 can determine that the primary data management agents 240, 290 are not functioning properly if a proper heartbeat message 291 is not received when expected (460). In some aspects, if a threshold number of heartbeat messages 291 are missed or a predetermined amount of time passes without receiving one, the recovery data management agents 245, 295 can initiate a disaster recovery storage failover process (470).

Computer System

Figure 5:
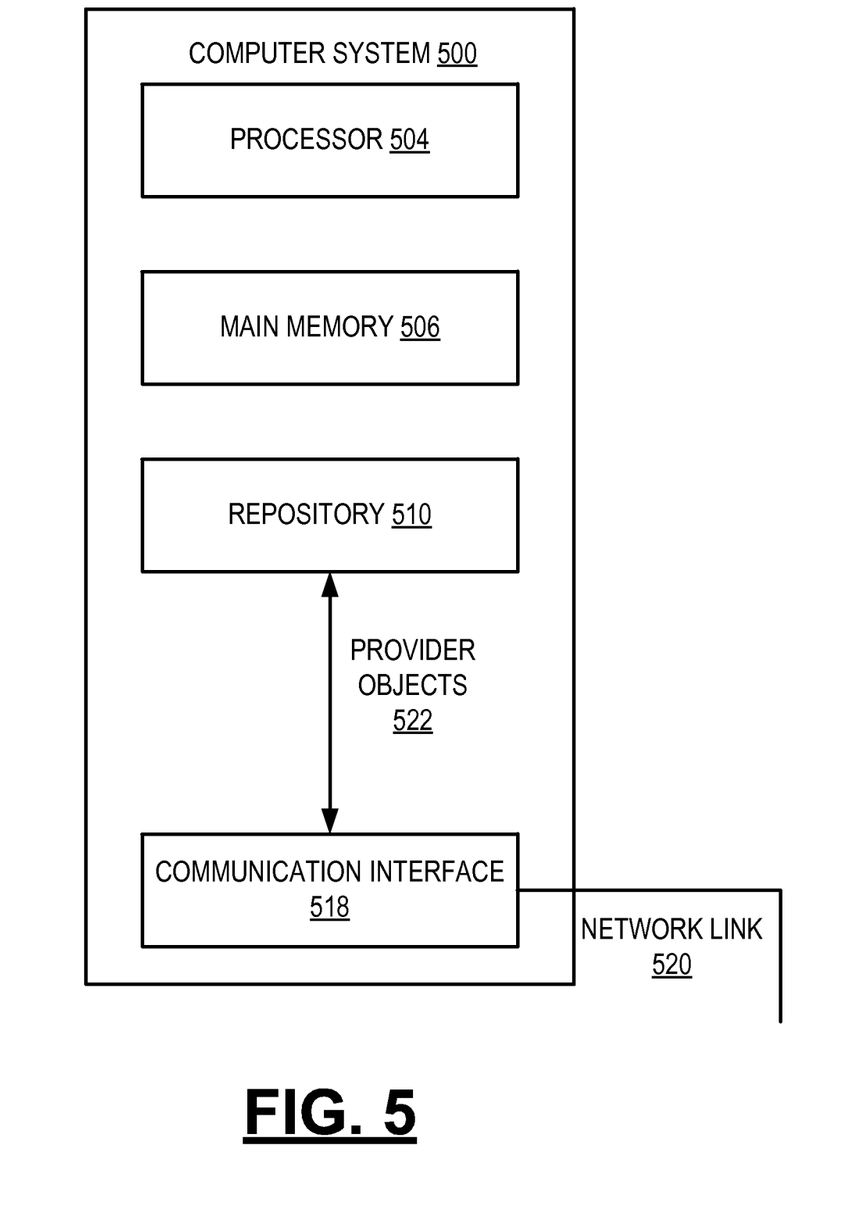
FIG. 5 is a block diagram that illustrates a computer system upon which aspects described herein may be implemented.

FIG. 5 is a block diagram that illustrates a computer system upon which aspects described herein may be implemented. For example, in the context of FIG. 1, primary data management agent 140 may be implemented using one or more servers such as described by FIG. 5.

In an aspect, computer system 500 includes processor 504, memory 506 (including non-transitory memory), repository 510, and communication interface 518. Computer system 500 includes at least one processor 504 for processing information. Computer system 500 also includes the main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 may also include a read only memory (ROM) or other static storage device for storing static information and instructions for processor 504. The repository 510 (e.g., a magnetic disk, flash storage, etc.) is provided for storing information and instructions including agent objects 522. The communication interface 518 may enable the computer system 500 to communicate with one or more networks through use of the network link 520 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., WiFi and WiMax networks).

Examples described herein are related to the use of computer system 500 for implementing the techniques described herein. According to one aspect, those techniques are performed by computer system 500 in response to processor 504 executing one or more sequences of one or more instructions contained in main memory 506. Such instructions may be read into main memory 506 from another machine-readable medium, such as repository 510. Execution of the sequences of instructions contained in main memory 506 causes processor 504 to perform the process steps described herein. In alternative aspects, hard-wired circuitry may be used in place of or in combination with software instructions to implement aspects described herein. Thus, aspects described are not limited to any specific combination of hardware circuitry and software.

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an aspect, can be combined with other individually described features, or parts of other aspects. Thus, absence of describing combinations should not preclude the inventor(s) from claiming rights to such combinations.

What is claimed is:

1. A data management agent comprising:
a memory resource to store instructions;
one or more processors using the instructions stored in the memory resource to:
update a volume on a primary storage area network connected to the data management agent, wherein the primary storage area network mirrors the update to the volume over a first connection to a corresponding volume on a recovery storage area network;
transmit a notification of the update to the volume over a second connection to a recovery data management agent connected to the recovery storage area network, whereupon receiving the notification, the recovery data management agent scans only the corresponding volume and selectively refreshes its cached information for the corresponding volume; and wherein the second connection is a management connection for management traffic only to transmit the notification and the first connection is a data connection for transferring data between the primary storage area network and the recovery storage area network;
retrieve configuration information from devices comprising the primary storage area network, wherein the configuration information is limited to device information utilized by a predetermined failover process;
transmit the configuration information over the second connection to the recovery data management agent; and
utilize the configuration information at the recovery data management agent as part of the predetermined failover process from the primary data management agent to the recovery data management agent.

2. The data management agent of claim 1, wherein transmitting the notification over the second connection does not impact the performance of the first connection.

3. The data management agent of claim 1, wherein the data management agent receives storage commands from a virtual machine monitor to provide storage access for a virtual machine using the primary storage area network and a recovery data management agent interfaces with a recovery virtual machine monitor for providing storage access to the virtual machine using the recovery storage area network as part of the failover process.

4. The data management agent of claim 1, wherein the predetermined failover process is initiated when the recovery data management agent fails to receive an expected heartbeat message from the data management agent.

5. The data management agent of claim 1, further comprising instructions to:
place the data management system in a passive mode;
exchange heartbeat messages with an active data management agent that manages communications with the primary storage area network; and take control of communications with the primary storage area network when the data management agent fails to receive an expected heartbeat message from the active data management agent.

6. The data management agent of claim 1, wherein the primary storage area network comprises a plurality of heterogeneous storage server appliances.

7. The data management agent of claim 6, wherein the data management agent communicates with the plurality of heterogeneous storage server appliances using a plurality of block-based protocols including Fibre Channel (FC), Fibre Channel over Ethernet (FCoE), iSCSI, ATA over Ethernet (AoE), and HyperSCSI.

8. A method of managing data, the method being implemented by one or more processors and comprising:
updating a volume on a primary storage area network connected to a data management agent, wherein the primary storage area network mirrors the update to the volume over a first connection to a corresponding volume on a recovery storage area network;
transmitting a notification of the update to the volume over a second connection from the data management agent to a recovery data management agent connected to the recovery storage area network, whereupon receiving the notification, the recovery data management agent scans only the corresponding volume and selectively refreshes its cached information for the corresponding volume; and wherein the second connection is a management connection for management traffic only to transmit the notification and the first connection is a data connection for transferring data between the primary storage area network and the recovery storage area network;
retrieving configuration information from devices comprising the primary storage area network, wherein the configuration information is limited to device information utilized by a predetermined failover process;
transmitting the configuration information over the second connection to the recovery data management agent; and
utilizing the configuration information at the recovery data management agent as part of the predetermined failover process from the primary data management agent to the recovery data management agent.

9. The method of claim 8, wherein transmitting the notification over the second connection does not impact the performance of the first connection.

10. The method of claim 8, wherein the data management agent receives storage commands from a virtual machine monitor to provide storage access for a virtual machine using the primary storage area network and a recovery data management agent interfaces with a recovery virtual machine monitor for providing storage access to the virtual machine using the recovery storage area network as part of the failover process.

11. The method of claim 8, wherein the predetermined failover process is initiated when the recovery data management agent fails to receive an expected heartbeat message from the data management agent.

12. The method of claim 8, further comprising:
placing the data management system in a passive mode;
exchanging heartbeat messages with an active data management agent that manages communications with the primary storage area network; and
taking control of communications with the primary storage area network when the data management agent fails to receive an expected heartbeat message from the active data management agent.

13. The method of claim 8, wherein the primary storage area network comprises a plurality of heterogeneous storage server appliances.

14. The method of claim 13, wherein the data management agent communicates with the plurality of heterogeneous storage server appliances using a plurality of block-based protocols including Fibre Channel (FC), Fibre Channel over Ethernet (FCoE), iSCSI, ATA over Ethernet (AoE), and HyperSCSI.

15. A non-transitory computer-readable medium that stores instructions, executable by one or more processors, to cause the one or more processors to perform operations that comprise:
updating a volume on a primary storage area network connected to a data management agent, wherein the primary storage area network mirrors the update to the volume over a first connection to a corresponding volume on a recovery storage area network;
transmitting a notification of the update to the volume over a second connection from the data management agent to a recovery data management agent connected to the recovery storage area network, whereupon receiving the notification, the recovery data management agent scans only the corresponding volume and selectively refreshes its cached information for the corresponding volume; and wherein the second connection is a management connection for management traffic only to transmit the notification and the first connection is a data connection for transferring data between the primary storage area network and the recovery storage area network;
retrieving configuration information from devices comprising the primary storage area network, wherein the configuration information is limited to device information utilized by a predetermined failover process;
transmitting the configuration information over the second connection to the recovery data management agent; and
utilizing the configuration information at the recovery data management agent as part of the predetermined failover process from the primary data management agent to the recovery data management agent.

16. The non-transitory computer-readable medium of claim 15, wherein transmitting the notification over the second connection does not impact the performance of the first connection.

17. The non-transitory computer-readable medium of claim 15, wherein the data management agent receives storage commands from a virtual machine monitor to provide storage access for a virtual machine using the primary storage area network and a recovery data management agent interfaces with a recovery virtual machine monitor for providing storage access to the virtual machine using the recovery storage area network as part of the failover process.

18. The non-transitory computer-readable medium of claim 15, wherein the predetermined failover process is initiated when the recovery data management agent fails to receive an expected heartbeat message from the data management agent.

19. The non-transitory computer-readable medium of claim 15, further comprising:
placing the data management system in a passive mode;
exchanging heartbeat messages with an active data management agent that manages communications with the primary storage area network; and taking control of communications with the primary storage area network when the data management agent fails to receive an expected heartbeat message from the active data management agent.

20. The non-transitory computer-readable medium of claim 15, wherein the primary storage area network comprises a plurality of heterogeneous storage server appliances.

* * * * *